Figure 1:
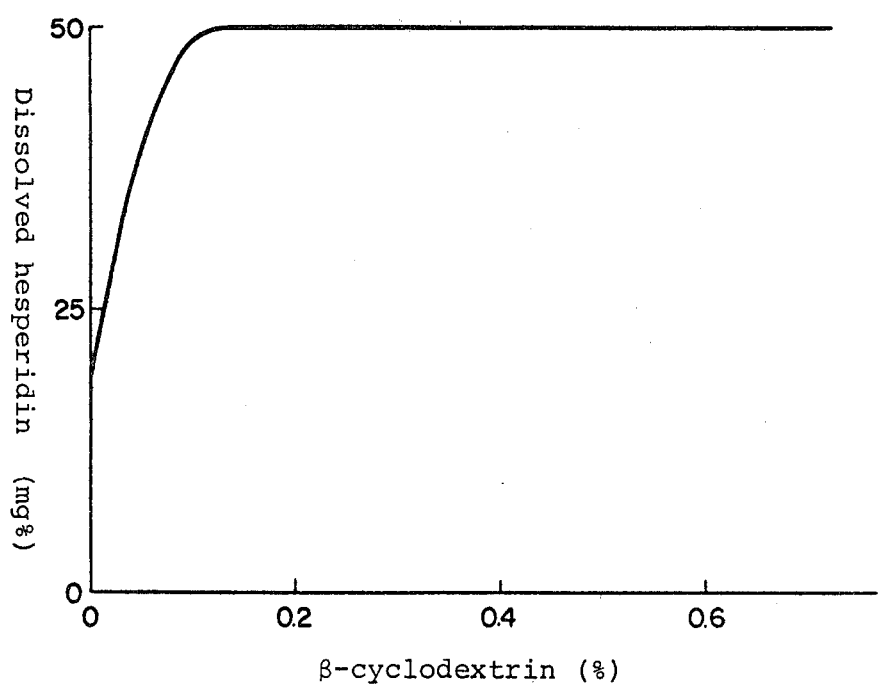

United States Patent [19]

Miyawaki et al.

[11] 4,332,825

[45] Jun. 1, 1982

[54] CITRUS FOOD CONTAINING A CYCLODEXTRIN

[75] Inventors: Masaru Miyawaki, Tsunoekita; Akira Konno, Osaka, both of Japan

[73] Assignee: Takeda Chemical Industries, Ltd., Osaka, Japan

[21] Appl. No.: 190,099

[22] Filed: Sep. 23, 1980

[30] Foreign Application Priority Data

Sep. 24, 1979 [JP] Japan .................................. 54-122419

[51] Int. Cl.³ ......................... A23B 7/44; A23L 1/212; A23L 2/16
[52] U.S. Cl. ................................ 426/330.5; 426/333; 426/599; 426/616; 426/578
[58] Field of Search ...................... 426/616, 131, 330.5, 426/333, 599, 661, 578

[56] References Cited

U.S. PATENT DOCUMENTS 4,163,807  8/1979  Jackman ........................... 426/330.5

FOREIGN PATENT DOCUMENTS 50-35349  4/1975  Japan .

Primary Examiner—Raymond N. Jones
Assistant Examiner—Elizabeth J. Curtin
Attorney, Agent, or Firm—Wenderoth, Lind & Ponack

[57] ABSTRACT

A citrus food, which is prepared by incorporating 0.005 to 1.0 weight percent of cyclodextrin into natural citrus fruit in the course of the production of said food, thereby removing or reducing the bitterness as well as in preventing the formation of cloudiness in the citrus food.

16 Claims, 1 Drawing Figure

CITRUS FOOD CONTAINING A CYCLODEXTRIN

This invention relates to improved foods, beverages and other edible products based on citrus fruit.

Citrus fruit generally contains a large variety of flavonoid compounds and, among these compounds, hesperidin and naringin tend to detract from the quality of the citrus fruit products as is described below. Thus, hesperidin occurs as solubilized in fresh citrus fruit, but when the fruit is processed into canned fruit packs, bottled beverages, etc. and stored, this compound begins to emigrate from the first tissues and is precipitated as white insoluble crystals. These crystals cause the so-called "clouding" in citrus food which, in turn, significantly decreases its sales value. The hitherto-known methods for preventing the aforementioned clouding in citrus food due to the hesperidin compound include addition of methylcellulose to the food to prevent precipitation of hesperidin and another comprising the addition of hesperidinase for the purpose of decomposing hesperidin. However, methylcellulose inherently has a viscosity-building property and, as such, displays a strong viscosity on dissolution in water. Therefore, this substance is disadvantageous in that it tends to cause an excess viscosity of the citrus food, such as that of syrup in canned mandarin oranges. Moreover, the recent tendency is to shy away from adding such synthetic gums as methylcellulose to foods and, in fact, such procedures are virtually not being practiced these days. When hesperidinase is utilized, the manufacturing conditions used in the production of the citrus food, such as the heating temperature, pH, etc., must be critically controlled in order to prevent inactivation or deactivation of the useful enzymes. Thus, the method is not necessarily satisfactory. In the case of canned mandarin oranges, elution of hesperidin from the segment is especially increased with time during storage after manufacture and it is therefore necessary to ensure that hesperidinase activity be maintained for a long time during storage. Thus, the storage of products is also subjected to limitations.

On the other hand, naringin is known to be a bitter material in citrus fruits such as grapefruit, summer oranges, buntan oranges, etc. and although its bitter taste is sometimes preferred, such citrus fruits rich in this substance are not suitable for ingestion or are of limited value because of their intence bitterness. It is for this reason, to treat such citrus products as marmalades, candied fruits, etc., from summer oranges with naringinase because the materials exhibit an intensely bitter taste. This treatment is followed by washing with water or to otherwise pretreat such fruit to remove its excess bitterness. These methods are, however, hot satisfactory in terms of productivity.

Furthermore, limonin is also known as one of the bitter constituents of citrus fruits such as navel oranges, valencia oranges, iyo oranges, etc. These citrus fruits are not used extensively used for canning or for the manufacture of juice products because of the bitter taste which develops in the juice and the segments when the fruits are allowed to stand exposed to air, or when pasteurized.

Under the foregoing circumstances, the present inventors conducted an intensive research for developing a method of preventing the clouding condition, and reducing the bitterness of citrus foods, making them suitable for commercial production. This has been achieved by treating the citrus products with cyclodextrin. The above finding has culminated in the perfection of the present invention.

It is an object of the present invention to provide an improved citrus food that has little or no undesirable taste or flavors and does not cloud.

Another object of this invention is to provide a process for treating a citrus food having improved qualities, which comprises incorporating 0.005 to 1.0 weight percent of cyclodextrin to natural citrus fruit in the course of the production of said food.

In the context of this invention, the term 'citrus food' means any and all of the fresh fruits of the so-called oranges such as mandarin oranges (Citrus Unshiu Marcovitch), summer oranges (Citrus Natsudaidai Hayata), valencia oranges, navel oranges, etc., lemons, grapefruit, buntan oranges (*Citrus grandis* Osbeck forma Buntan Hayata), daidai oranges (*Citrus Aurantium Linn. var cyathifera* Y. Tanaka), kinkan oranges (Fortunella japonica Swingle), tachibana oranges (Citrus Tachibana Tanaka), sudachi oranges (Citrus sudachi Hort. ex Shirai), hassaku oranges (Citrus Hassaku Hort. ex Y. Tanaka), iyo oranges (Citrus Iyo Hort. ex Tanaka), marmelo oranges, etc and various processed foods prepared from such fruits. As examples of processed foods prepared from citrus fruits, there may be mentioned candied fruits, canned and bottled segment packs in syrups, jams, marmalades, and fruit juice beverages.

Many species of cyclodextrin are known, such as $\alpha$-cyclodextrin consisting of 6 pyranoglucose units linked by $\alpha$-1,4-glucosidic bonds, $\beta$-cyclodextrin consisting of 7 linked pyranoglucose units, $\gamma$-cyclodextrin consisting of 8 units and so forth. Among these species, $\beta$-cyclodextrin is most successfully employed in the practice of this invention. Mixtures of these cyclodextrins also can be employed as well. These species of cyclodextrin need not necessarily be pure preparations, but may be crude preparations including, for example, oligo-saccharides originating from raw materials.

In accordance with this invention, cyclodextrin is added to natural citrus materials in a proportion of 0.005 to 1.0 weight percent, preferably 0.01 to 0.7 weight percent, and more preferably 0.05 to 0.5 weight percent, based on the weight of the citrus material. It is undesirable to add cyclodextrin in an amount exceeding 1 weight percent because a white sediment is often formed in the citrus food. A natural citrus material means a fresh fruit as harvested, and even when it is used as peeled, concentrated or diluted, cyclodextrin is added in the above proportional range based on the amount converted to natural citrus material. For example, in preparing a fruit juice from 500 ml of a ½ concentrate of unshiu mandarin orange juice, twice the volume, i.e. one liter, is considered to be the amount of natural citrus material present and the level cyclodextrin added is based on one liter. The amount of cyclodextrin to be added to any specific citrus food is determined with reference to the variety of citrus food, the time of harvest, and the type of citrus food, e.g. whether the desired food is a canned fruit or a marmalade etc. When the bitterness is to be removed, it may sometimes be desirable to leave some of the bitter causing material in the food for improved delicacy, and, therefore, the level of addition of cyclodextrin is selected taking this into consideration.

The method and timing of adding cyclodextrin are not critical and the production procedures and conditions heretofore employed need not be altered. In the case of canned mandarin oranges, cyclodextrin powder can be directly added to the cans together with the conventional pretreated mandarin orange segments and syrup and, thereafter, the filled cans are processed in a conventional manner. Further, when a bitter citrus fruit is served for eating in a fresh condition, a cyclodextrin powder can be dusted directly over the fruit. By doing so, the excess bitter taste is eliminated and the fruit is made tasteful.

In accordance with this invention, the conventional essential additives such as sweeteners, acids, etc. can be added in the same manner as have been done conventionally, without interfering with the function and effect of cyclodextrin.

Further, in accordance with this invention, the addition of a very small amount of cyclodextrin is highly effective in the reduction or removal of the cloudiness and bitterness from citrus food. Moreover, the procedure required is very simple. Thus, the conventional enzymatic treatment involving the use of hesperidinase or nariginase is always accompanied by the problems of enzyme inactivation and, therefore, subject to limitations in the pH and heating conditions during production. In contrast, the method of this invention is not only substantially free from such limitations but is effective for both the purpose of preventing clouding and reducing or removing the bitter taste.

Furthermore, even for citrus fruits, such as grapefruit, valencia oranges, navel oranges, iyo oranges, summer oranges, etc. whose bitterness has so far given them a limited utility, the method of this invention provides a broader utility for such fruits. By way of example, summer oranges have not been used by the canning industry because of its intensely bitter taste, but the addition of cyclodextrin according to this invention permits an adjustment of the intensity of the bitterness of these oranges therefore, making it possible to can these segments. Moreover, the production of a marmalade from the rind or peeling of summer oranges, marmelo oranges, etc., by the conventional pretreatment of rinsing the fruit over a long time to reduce its bitterness is now eliminated so that the operation efficiency is improved.

The citrus food freed from the problems of cloud and bitterness by the method of this invention is characterized in that these effects persist for a long storage time, and thus the food remains highly stable for a long time.

The following experimental data and examples are further illustrative of this invention.

EXPERIMENT 1

One part of a 1/10 N-aqueous solution of sodium hydroxide containing 150 mg % of hesperidin, 1 part of an aqueous solution containing 60% of sucrose and 2.55% of citric acid and one of the various additives indicated in Table 1 were admixed well and stored at 30° C. for 3 days. The mixtures were then examined for the amounts of sediments.

The results are also shown in Table 1. It is clear that β-cyclodextrin produced a marked prevention of the formation of sediments as did methylcellulose. And while dextrin was somewhat effective in the prevention of sedimentation, glucose, sucrose, pullulan, gum arabic, pectin, gum tragacanth and xanthan gum failed to show such effects.

TABLE 1

| Additive | Level of addition (%) (final conc.) | Amount of sediment |
| --- | --- | --- |
| Control | 0 | ++ |
| β-cyclodextrin | 0.1 | − |
| Sucrose | 5.0 | ++ |
| Glucose | 5.0 | ++ |
| Dextrin | 5.0 | + |
| Methylcellulose | 0.1 | − |
| Pullulan | 0.1 | ++ |
| Pectin | 0.1 | ++ |
| Gum arabic | 0.1 | ++ |
| Gum tragacanth | 0.1 | ++ |
| Xanthan gum | 0.1 | ++ |

(Note)
−: no sediment,
+: some sediment,
++: a large amount of sediment

Then, the level of addition of β-cyclodextrin was varied, the samples were stored for a week and the amounts of dissolved hesperidin were determined. The results are shown in FIG. 1. It is apparent that an increasing amount of β-cyclodextrin results in an increased amount of dissolved hesperidin. A 50 mg% solution of hesperidin did not produce a sediment at all when about 0.1% of β-cyclodextrin had been added.

EXPERIMENT 2

One part of a 1/10 N aqueous solution of sodium hydroxide containing 150 mg % of hesperidin, 1 part of an aqueous solution containing 50.1% of sucrose, 9% of glucose and 2.55% of citric acid, and 1 part of a 1% aqueous solution of β-cyclodextrin were admixed together and stored at 30° C. The mixture was then examined for sediments on the basis of variation per day.

The results are shown in Table 2. In the β-cyclodextrin-free (control) group, the amount of sediment increased day by day, but the β-cyclodextrin group showed no sediments at all over a long period of time.

TABLE 2

| Days of storage | 1 | 2 | 4 | 7 | 15 |
| --- | --- | --- | --- | --- | --- |
| Control (no additive) | + | ++ | +++ | +++ | +++ |
| β-cyclodextrin added | − | − | − | − | − |

(note)
−: no sediment;
+: slight sediment;
++: sediment;
+++: marked sediment.

EXPERIMENT 3

In a 10% solution of sucrose was added a sufficient amount of naringin to give one of the concentrations as shown in Table 3. The intensities of bitterness of the resulting mixtures were compared by a panel test.

The results are set forth in Table 3. It is apparent that an increasing concentration of β-cyclodextrin resulted in a decreasing severity of bitterness.

TABLE 3

| Concentration of β-cyclodextrin | Degree of bitterness |
| --- | --- |
| 0 | Very remarkably bitter |
| 0.001 | Fairly bitter |
| 0.005 | Bitterness decreased remarkably |
| 0.01 | Only slightly bitter |
| 0.05 | Almost no bitter taste |
| 0.1 | Almost no bitter taste |
| 0.3 | Almost no bitter taste |

TABLE 3-continued

| Concentration of β-cyclodextrin | Degree of bitterness |
| --- | --- |
| 1.0 | Almost no bitter taste |

EXAMPLE 1

Peeled Unshiu mandarin oranges were pretreated with acid and alkali in the conventional manner and 250 g of the segment was packed into a No. 4 (Japan Agricultural Standard, 74.1 mm in diameter and 113 mm in height) can together with 200 g of a syrup made of 20% sucrose and 20% glucose, fructose and liquid sugar in which 0.75% of β-cyclodextrin had been dissolved. The can was sealed, heated at 82° C. for 20 minutes and cooled to give a canned mandarin orange pack. As controls, a canned product without any anti-clouding agent, a product with 0.002% (based on syrup) of methylcellulose and a product with 0.05 unit/ml (based on syrup) of hesperidinase were also prepared.

These mandarin orange packs were stored at room temperature for a month and each of the cans was opened and examined for the clarity of syrup. The clarity measurement was carried out in the following manner. A white sheet of paper was marked with a black dot (5 mm in diameter) and a transparent flat-bottomed glass column 25 mm in diameter was placed on the sheet in concentric relation with the black dot. Each syrup was poured into the glass column with the black dot being watched and the height (mm) of the body of liquid at which the black dot had just ceased to be visible was recorded and regarded as representing the clarity of the syrup. The clarity values thus found were 50 mm in the case of the blank control (no additive), 110 mm for the methylcellulose group and 150 mm for the hesperidinase group. The value for the β-cyclodextrin group was more than 200 mm, evidencing the excellent cloud prevention effects of the method of this invention.

EXAMPLE 2

Peeled Unshiu mandarin oranges were treated with acid and alkali in the conventional manner and 250 g of the segments were put in a No. 4 can. To this can was added 200 g of a 40% syrup containing 1% (0.15% as a cyclodextrin-mixture consisting of α-cyclodextrin, β-cyclodextrin and γ-cyclodextrin) of a commercial crude preparation of cyclodextrin (trade name: Seldex CH-20, Nippon Shokuhin Kako K.K., Japan). The can was sealed and heated at 80° C. for 10 minutes to obtain a canned mandarin orange pack.

The above can was stored at 30° C. for 1 month, after which it was opened and examined for the clarity of the syrup and the amount of dissolved hesperidin in the syrup. The results are presented in Table 4.

TABLE 4

|  | Clarity (mm) | Amount of dissolved hesperidin (mg %) |
| --- | --- | --- |
| Control (no additive) | 70 | 18 |
| Cyclodextrin added | 185 | 25 |

(Note) The clarity values are those obtained by the method set forth in Example 1.

It is apparent from the above data that the addition of cyclodextrin increased the amount of dissolved hesperidin in the syrup in the canned mandarin orange pack and that the syrup retained its clarity very well.

EXAMPLE 3

Peeled summar oranges (Citrus Natsudaidai) were treated with acid and alkali in the same manner as described for the production of canned unshiu mandarin orange packs, and 300 g of the segments were put in a No. 4 can. After addition of 150 g of a 50% sugar syrup containing 0.1% of β-cyclodextrin as dissolved therein, the filled can was pinch-sealed in vacuo and pasteurized at 85° C. for 20 minutes to give a canned summar orange pack.

This can was stored at room temperature for a month and the contents were submitted to a panel of tasters. The summer oranges with added β-cyclodextrin were much less bitter than a control product without β-cyclodextrin.

EXAMPLE 4

To 500 g of washed Buntan orange (Citrus buntan) rind was added 700 g of a 60% sugar syrup containing 0.05 g of β-cyclodextrin, the mixture was boiled and allowed to dry in the air, and sucrose was dusted over the orange rind to give a candied Buntan orange product.

The above candied rind was sparingly bitter and was very delicious.

EXAMPLE 5

One kg of summar oranges were sorted into peel and segments and the peel was rinsed to remove any foreign matter and chipped. The segments were separately processed into fruit juice.

To the peel and juice were added 500 g of water and 5 g of β-cyclodextrin, the mixture was heated under stirring, 1 kg of sucrose was added, and the mixture was concentrated by heating to give a marmalade.

The marmalade with added β-cyclodextrin was markedly less bitter than the control marmalade.

EXAMPLE 6

A mixture of 60 g of valencia orange juice, 60 g of summer orange juice, 15 g of orange juice sacs, 100 g of sucrose, 1.5 g of citric acid and 0.5 g of β-cyclodextrin was made up with water to 1000 ml and pasteurized at 95° C. The pasteurized mixture was filled into a 200 ml bottle and stored at room temperature for 3 months. Then, the contents were examined for sediments.

Whereas the cyclodextrin-free control product showed a white sediment, the product with added β-cyclodextrin did not show any white sediment.

Moreover, the product containing β-cyclodextrin was not bitter to the taste.

EXAMPLE 7

To 1 kg of navel orange segments were added 100 g of sucrose, the mixture was homogenized by the use of a blender and then filtered through folio gauzes. Thus, 800 g of navel orange juice was obtained.

Then, the above juice was divided into four equal parts and each of them was treated by the procedures shown in Table 5, respectively. The bitterness of the resulting juices were compared by a panel test.

The results are set forth in Table 5. Whereas the cyclodextrin-free products showed a marked bitterness and were not suitable for the production of juice, the products in which 0.5 weight percent of β-cyclodextrin was added gave no substantial bitter taste and were very delicious.

TABLE 5

| Heating treatment | Days of storage | Amount of added β-cyclodextrin (weight %) | Degree of bitterness |
| --- | --- | --- | --- |
| Not heating | 1 | 0 | Remarkably bitter |
| | 1 | 0.5 | Almost no bitter taste |
| Heating at 90° C. for 10 minutes | 30 | 0 | Very remarkably bitter |
| | 30 | 0.5 | Almost no bitter taste |

EXAMPLE 8

To 500 g of peeled Iyo oranges (Citrus Iyo) was added 500 ml of water, the mixture was homogenized by the use of a blender and then filtered through a polyvinylidene chloride cloth to obtain a juicy mixture.

To the thus obtained mixture were added 8 weight percent of sucrose and 0.3 weight percent of β-cyclodextrin, and then heated until its temperature rose up to 95° C. and then cooled with water. At the same time, the β-cyclodextrin-free product was prepared as control.

The qualities of these juicy products were subjected to comparison by a panel test. As a result of the test, whereas the β-cyclodextrin-free product showed marked bitterness and was not suitable for a beverage, the bitterness of the product with β-cyclodextrin added decreased to the extent that at had a suitable taste and the juice was very delicious.

EXAMPLE 9

Peeled Hassaku oranges (Citrus Hassaku) were treated with acid and alkali in the same conventional manner as described for the production of a canned mandarin orange pack and 210 g of the segments were put in a No. 5 can (Japan Agricultural Standard, 74.1 mm in diameter and 81.3 mm in height). To this can was added 107 g of a 30% syrup containing 1% (0.15% as cyclodextrin-mixture consisting of α-cyclodextrin, β-cyclodextrin and γ-cyclodextrin) of a commercial crude preparation of cyclodextrin (trade name: Seldex CH-20, Nippon Shokuhin Kako K.K., Japan). The can was sealed and heated at 80° C. for 20 minutes to obtain a canned Hassaku orange pack. At the same time, the β-cyclodextrin-free product was prepared as a control.

The above cans were stored at 30° C. for 1 month, after which they were opened and compared by a panel test. As a result of the test, wherein the cyclodextrin-free product was not suitable for ingestion because of its intense bitterness, the product with added cyclodextrin had moderate bitterness and was very delicious.

EXAMPLE 10

Ten kg of Valencia oranges (whole fruit) was crushed and pressed to extract juice, followed by centrifuging to remove fibers. Thus, 5 kg of fruit juice was obtained and then divided into two equal parts. To one of them was added 5 g of β-cyclodextrin, and to the other one no β-cyclodextrin was added and each of them was concentrated to 1 kg in vacuo to prepare the concentrated juice, respectively.

To each of thus obtained concentrate was added 4 kg of water to give 100% returned juice, and was judged by a panel test. The result was that the bitterness of the product incorporated with β-cyclodextrin was apparently less than that of the β-cyclodextrin-free product.

Moreover, the product with the β-cyclodextrin added exhibited sweetness, had good flavor and the added β-cyclodextrin tended to increase yellow color of the juice.

EXAMPLE 11

Five kg of peeled grapefruits were crushed and pressed, followed by subjecting the resulting juice to filtration through a polyvinylidene chloride cloth.

To the thus obtained juice was added 300 g of sucrose and 20 g of β-cyclodextrin, and the mixture was then heated to a temperature of 95° C. and cooled with water; at the same time, the β-cyclodextrin-free product was prepared as a control.

The qualities of these products were compared by a panel test. As a result of the test, whereas the β-cyclodextrin-free product was so bitter that it was not suitable for production of a beverage, the product with the β-cyclodextrin added exhibited far less bitterness such that it was suitable for use as a beverage.

What is claimed is:

1. A citrus food stabilized against clouding and possessing reduced bitterness, which consists essentially of a natural citrus material and 0.005 to 1.0 percent by weight of a cyclodextrin, based on the weight of the natural citrus material.

2. A citrus food according to claim 1, wherein the amount of a cyclodextrin is 0.01 to 0.7 percent by weight, relative to the weight of the natural citrus material.

3. A citrus food according to claim 1, wherein the amount of a cyclodextrin is 0.05 to 0.5 percent by weight, relative to the weight of the natural citrus material.

4. A citrus food according to claim 1, wherein the citrus food is selected from the group consisting of canned and bottled segment packs in syrup, marmalade, candied fruit or fruit juice beverage.

5. A citrus food according to claim 1, wherein the cyclodextrin is β-cyclodextrin.

6. A citrus food according to claim 1, wherein the cyclodextrin is a mixture of cyclodextrins.

7. A citrus food according to claim 1, wherein the natural citrus material is selected from the group consisting of valencia oranges or mandarin oranges.

8. A citrus food according to claim 1, wherein the natural citrus material is selected from the group consisting of navel oranges, grapefruit, hassaku oranges, iyo oranges or summer oranges.

9. A process for producing a citrus food stabilized against clouding and possessing reduced bitterness, which consists essentially of incorporating 0.005 to 1.0 percent by weight of a cyclodextrin into the natural citrus material, based on to the weight of the natural citrus material.

10. A process according to claim 9, wherein the amount of a cyclodextrin is 0.01 to 0.7 percent by weight, relative to the weight of the natural citrus material.

11. A process according to claim 9, wherein the amount of a cyclodextrin is 0.05 to 0.5 percent by weight, relative to the weight of the natural citrus material.

12. A process according to claim 9, wherein the citrus food is selected from the group consisting of canned and bottled segment packs in syrup, marmalade, candied fruit or fruit juice beverage.

13. A process according to claim 9, wherein the cyclodextrin is β-cyclodextrin.

14. A process according to claim 9, wherein the cyclodextrin is a crude cyclodextrin.

15. A process according to claim 9, wherein the natural citrus material is selected from the group consisting of valencia oranges or mandarin oranges.

16. A process according to claim 9, wherein the natural citrus material is selected from the group consisting of navel oranges, grapefruit, hassaku oranges, iyo oranges or summer oranges.

* * * * *